United States Patent
Eyers et al.

(10) Patent No.: US 9,114,347 B2
(45) Date of Patent: Aug. 25, 2015

(54) MOISTURE SEPARATION SYSTEM FOR HIGH EFFICIENCY FILTRATION

(71) Applicant: BHA Altair, LLC, Franklin, TN (US)

(72) Inventors: William Keith Albert Eyers, Chobham (GB); John Carl Davies, Portsmouth (GB)

(73) Assignee: BHA Altair, LLC, Franklin, TN (US)

( * ) Notice: Subject to any disclaimer, the term of this patent is extended or adjusted under 35 U.S.C. 154(b) by 3 days.

(21) Appl. No.: 13/912,891

(22) Filed: Jun. 7, 2013

(65) Prior Publication Data
US 2014/0360370 A1  Dec. 11, 2014

(51) Int. Cl.
*B01D 50/00* (2006.01)
*B01D 45/08* (2006.01)
*B01D 46/00* (2006.01)
*B01D 53/26* (2006.01)

(52) U.S. Cl.
CPC .............. *B01D 50/002* (2013.01); *B01D 45/08* (2013.01); *B01D 46/003* (2013.01); *B01D 46/0023* (2013.01); *B01D 53/266* (2013.01); *B01D 2275/10* (2013.01); *B01D 2279/60* (2013.01)

(58) Field of Classification Search
CPC ........... B01D 2279/60; B01D 46/0023; B01D 46/003; B01D 45/04; B01D 45/08; B01D 50/002; B01D 2275/10
USPC ........... 55/320, 323, 325, 482, 485, 486, 487; 95/268, 287
See application file for complete search history.

(56) References Cited

U.S. PATENT DOCUMENTS

| | | | |
|---|---|---|---|
| 4,300,918 A | 11/1981 | Cary | |
| 5,064,453 A | 11/1991 | Jacquish | |
| 6,123,751 A | 9/2000 | Nelson et al. | |
| 6,540,805 B2 * | 4/2003 | Ohno et al. | 55/486 |
| 7,527,674 B1 | 5/2009 | Janawitz et al. | |
| 8,167,980 B2 * | 5/2012 | Hiner et al. | 95/268 |
| 2010/0050873 A1 | 3/2010 | Hiner et al. | |
| 2010/0154980 A1 | 6/2010 | Daniel et al. | |
| 2011/0083419 A1 | 4/2011 | Upadhyay et al. | |
| 2012/0124961 A1 | 5/2012 | Jarrier et al. | |

OTHER PUBLICATIONS

GE Energy AltairSystem3 Filtration System brochure, 2009.*
GE Energy AltairVega Filtration System brochure, 2006.*

* cited by examiner

*Primary Examiner* — Robert Clemente
(74) *Attorney, Agent, or Firm* — Reinhart Boerner Van Deuren P.C.

(57) ABSTRACT

An air treatment system and method that uses inertial moisture separators in two stages for removing moisture present in intake air entering the air treatment system, thereby increasing the effectiveness and lifespan of high efficiency filters that otherwise may become clogged by accumulating moisture.

14 Claims, 3 Drawing Sheets

MOISTURE SEPARATION SYSTEM FOR HIGH EFFICIENCY FILTRATION

BACKGROUND OF THE INVENTION

The present invention relates generally to air filtration and demoisturizing systems for gas turbines.

Gas turbines include inlet air treatment systems that remove dust and moisture from air that is channeled to the compressor of the gas turbine. Some inlet air treatment systems include moisture separators and coalescing pads that remove moisture from intake air, and pre-filters and final filters that remove dust and debris from the intake air. During normal operating conditions, it is desired to have the inlet air treatment system channel clean, dehydrated air to the gas turbine compressor with minimal airflow disruption and air pressure drop. Eventually, used coalescers and filters become clogged and cause an excessive air pressure drop under normal operating conditions. Over time, the pressure drop across these air treatment elements results in reducing the operating efficiency of the gas turbine. In some instances, the reduced air pressure may cause a compressor surge that may damage the compressor.

Accordingly, it is desirable to provide an air treatment system and method that minimizes clogging of air treatment elements, such as air filters, to avoid a reduced air pressure that may cause a compressor surge. Moisture removal systems currently operate either 1 or 2 vane banks that use inertial separation to remove water. One bank of these vanes is placed in front of the filters to remove bulk water, and then a second bank (if used) is place behind the last filter to prevent moisture from reaching the gas turbine.

The discussion above is merely provided for general background information and is not intended to be used as an aid in determining the scope of the claimed subject matter.

BRIEF DESCRIPTION OF THE INVENTION

An air treatment system and method that uses inertial moisture separators in two stages for removing moisture present in intake air entering the air treatment system, thereby increasing the effectiveness and lifespan of high efficiency filters that otherwise may become clogged by accumulating moisture. In one embodiment, the layout of the vane banks is rearranged to place the second bank behind the first set of filters and place the final filters behind this second bank. In this arrangement the final filters are kept away from any water that may be in the intake system. An advantage that may be realized in the practice of some disclosed embodiments of the air treatment system is improved air filtration efficiency and reduced maintenance frequency for air filtration elements in an air treatment system. Also, the final filters do not have to be hydrophobically treated and the issues with water reaction on the final filters is diminished.

In one embodiment, a multi-stage filtration system is disclosed. The system comprises a first inertial moisture separator in a first stage of the filtration system for removing moisture present in air entering the filtration system, a coalescing first filter in a second stage of the filtration system for removing particulate matter and for coalescing moisture present in the air that has passed through the first stage of the filtration system, and a second inertial moisture separator in a third stage of the filtration system for removing coalesced moisture present in the air that has passed through the second stage of the filtration system.

In another embodiment, a filter house is disclosed. The filter house comprises an air intake hood, a first inertial moisture separator in a first stage of the filter house behind the air intake hood, the inertial moisture separator configured to remove water droplets from intake air entering the filter house, a coalescing pre-filter in a second stage of the filter house configured to remove particles in the air that has passed through the first stage of the filter house and to coalesce water droplets in the air that has passed through the first stage of the filter house, and a second inertial moisture separator in a third stage of the filter house configured to remove from the air that has passed through the second stage of the filter house water droplets coalesced by the coalescing pre-filters.

In yet another embodiment, a method of filtering air to be used in a gas turbine is disclosed. The method comprises removing water droplets from incoming air using a first inertial moisture separator, after the step of removing the water droplets, filtering particles from the incoming air and coalescing water droplets that have passed through the first inertial moisture separator, and after the step of filtering particles and coalescing water droplets, removing water droplets from the incoming air using a second inertial moisture separator.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
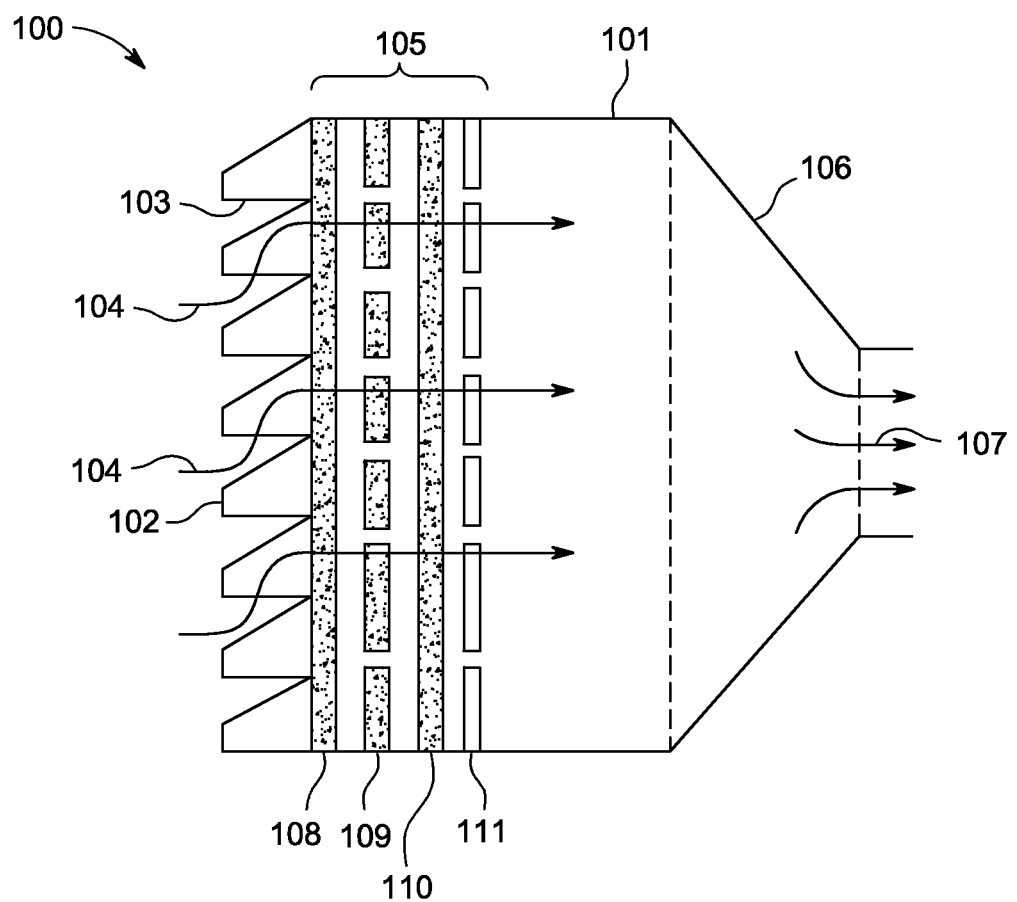
FIG. 1 is a schematic view of an exemplary air filtering system.

FIG. 1 illustrates an embodiment of a portion of an air treatment system 100, e.g., a filter house, that generally includes a housing 101, a plurality of air intake hoods 102 that are vertically spaced and mounted to the front of the housing 101 and are open to the atmosphere via openings 103 at their bottom portions. Intake air 104 is drawn through these openings 103 and through a plurality of spaced apart air treatment elements 105, then into a narrowing portion of air conduit 106, such as an air duct, that channels clean dehydrated air in a downstream direction 107 toward a gas turbine, for example. The air treatment elements 105 may be sufficiently separated to allow service personnel to enter between them for replacement and/or repair of the air treatment elements 105.

A first stage of the plurality of air treatment elements 105 may include demoisturizing elements which, in one embodiment, include inertial moisture separators 108, also known as marine vane separators, positioned to remove water droplets from intake air 104. This first stage of the air treatment system 100 may be configured to capture water droplets having a size on the order of about 5 μm (microns) and greater. Such captured water droplets may be allowed to drain downward by force of gravity wherein the captured water may eventually be channeled to a drainage system.

In one embodiment, a second stage of the air treatment system 100 may include coalescing pre-filters 109 that provide a coarse filtration to remove larger particles from the intake air 104 and to coalesce the smaller water droplets that have passed through the first stage into larger water droplets. The filter media in the second stage coalescing pre-filters 109 may be configured to admit finer particles, e.g. less than about 1-2 μm while trapping the coarser particles. Because the larger droplets coalesced by the second stage of the air treatment system often clog, or "blind", finer filter media, a third stage of the air treatment system 100 may be configured to include a second bank of inertial moisture separators 110, in the form of marine vane separators 108, as in the first stage, to further dehydrate the intake air 104 by removing the coalesced water droplets. A fourth stage of the air treatment system 100 may include finer air filters 111 configured to remove fine dust and other particles on the order of about 0.1 μm or larger in size. This final filtering stage may alternatively be configured as a dual stage filter utilizing an intermediate filter bank for removing particles from the intake air 104 on the order of 0.3 μm to 0.4 μm or larger in size followed by the 0.1 μm filter. Because of the redundant inertial moisture separators 110 in the third stage (redundant with the first stage inertial moisture separators 108), the final finer filter stage 111 operates more efficiently and requires less maintenance due to less moisture clogging the filter media therein. After this fourth stage of the air treatment system 100 the intake air 104 may pass into conduit 106 in the downstream direction 107 toward a gas turbine, for example. The gas turbine typically provides the suction force for drawing the intake air 104 through intake hood openings 103 and through the air treatment elements 105.

Figure 2:
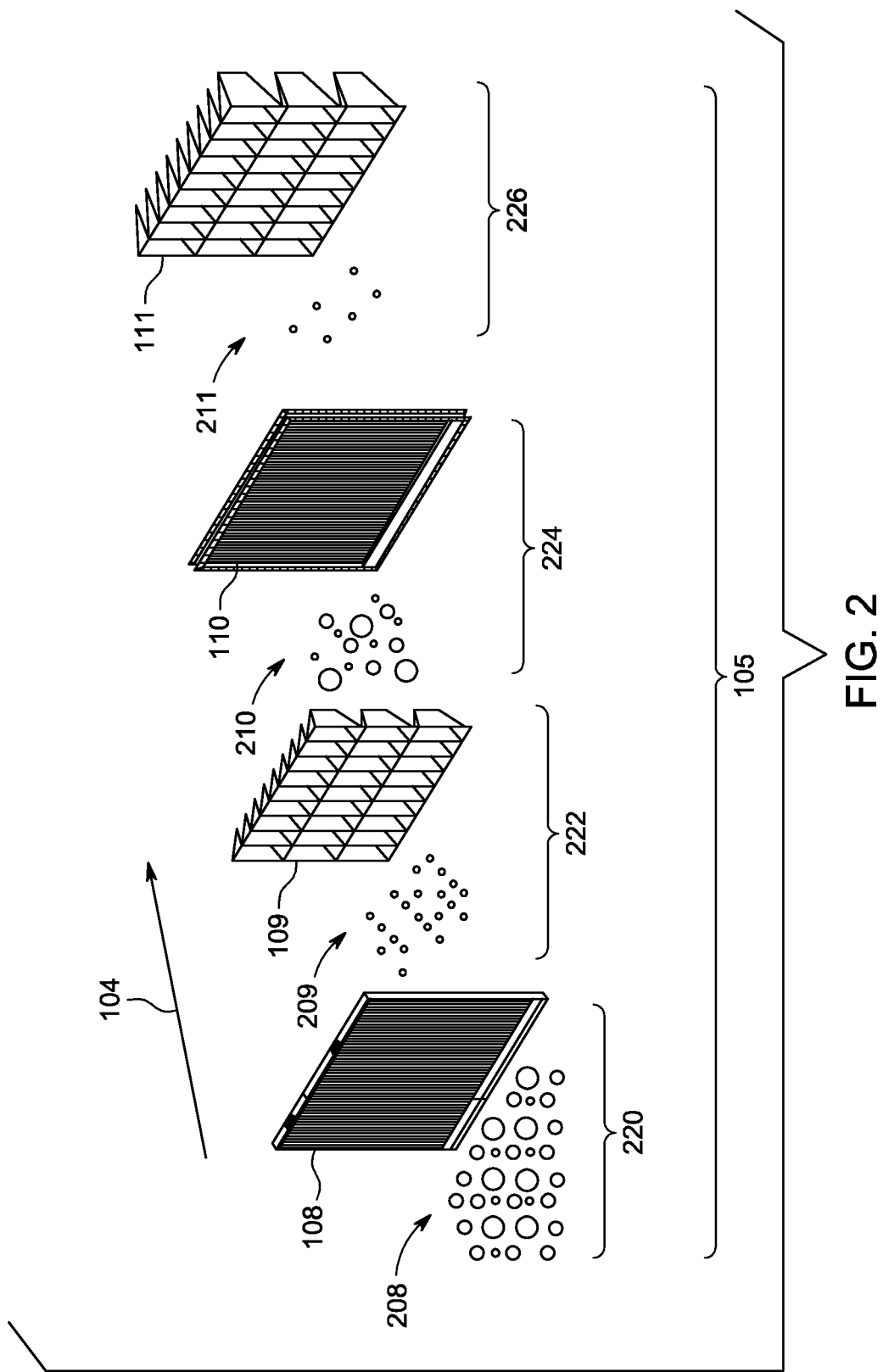
FIG. 2 is a schematic view of an exemplary multi-stage filter assembly that may be used with the exemplary air filtering system shown in FIG. 1.

FIG. 2 generally illustrates the progressive stage treatment of the intake air flow 104 as the air treatment elements 105 remove water and contaminants therefrom. Ambient air entering the air treatment system 100 includes moisture of various droplet sizes 208 that is partially captured by the first stage 220 inertial moisture separator 108 which removes the larger sized water droplets, such as those sized from approximately 5 μm and larger, from intake air 104. This leaves smaller sized droplets 209 in the intake air 104 continuing through the air treatment system 100 into a second stage 222 coalescing pre-filter 109 which acts to coalesce the smaller sized water droplets 209 which have passed through the first stage 220. A portion of the smaller water droplets 209 are coalesced into larger sized water droplets 210 as the air flow 104 passes through the coalescing pre-filter 109. In addition to coalescing smaller sized droplets 209 the coalescing pre-filter 109 also filters dust particles and other debris, e.g. on the order of about 1-2 μm and larger in size, from the air flow 104.

A third stage 224 inertial moisture separator 110 again captures larger water droplets, e.g., on the order of about 5 μm in size and greater, leaving sufficiently demoisturized intake air 104 with a small amount of miniscule water droplets 211 that preserves the efficient operation of the final stage 226 of air filtration. Air filter 111 removes fine debris and dust particles from the intake air 104, e.g. on the order of about 0.1 μm and larger. As described above, this final filtration stage 226 may include dual filters which removes fine dust and debris via a two stage filter. The filter media used in the fourth stage 226 is often treated with a hydrophobic coating which acts to resist moisture from becoming clogged therein. However, over time, as the hydrophobic treatment wears off, water tends to clog, or "blind", the finer filter 111 which reduces its effectiveness and increases a differential pressure across the final filter 111, potentially shortening its life, requiring more frequent replacement, and negatively affecting operation of the downstream gas turbine. Such high efficiency air filters can have a severe reaction to water and cause a large differential air pressure drop requiring a shutdown of downstream gas turbines. Thus, there is an advantage when using these filter media to keep them as dry as possible. The redundant inertial moisture separators 108, 110 reduce these deleterious effects.

Figure 3:
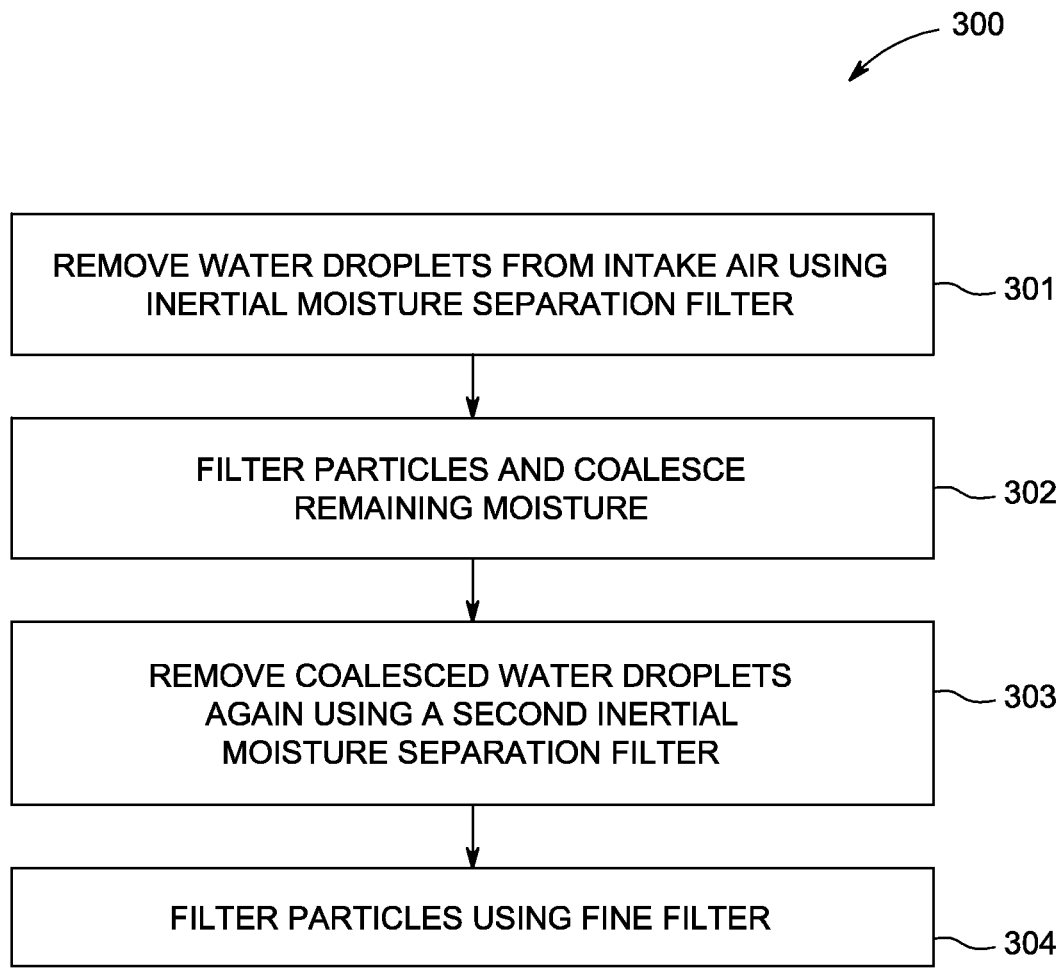
FIG. 3 is a flowchart of a method of operating the air filtering system shown in FIG. 1.

FIG. 3 illustrates a flow chart representing a method of operating 300 the air treatment system 100. In the first step 301, water droplets are removed from intake air 104 using inertial moisture separators 108 in a first stage 220 of the air treatment system 100. In the next step 302, dust particles are removed from intake air 104 and moisture that passed through the first stage 220 is coalesced using coalescing pre-filters 109 in a second stage 222 of the air treatment system 100. In the next step 303, coalesced water droplets are again removed from intake air 104 using inertial moisture separators 110 in a third stage 224 of the air treatment system 100. In the next step 304, finer dust particles are removed from intake air 104 using a high efficiency filter 111 in a fourth stage 226 of the air treatment system 100. The fourth stage may alternatively include an intermediate filter just prior to the final fine filter for a dual-filter implementation in the fourth stage.

In view of the foregoing, embodiments of the invention avoids unnecessary differential pressure increases, improves air filtration efficiency, and reduces maintenance frequency for air filtration elements in an air treatment system. A technical effect is an air treatment system that maximizes up time for gas turbine compressors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-stage filtration system comprising:
   a first inertial moisture separator in a first stage of the filtration system for removing moisture present in air entering the filtration system;
   a coalescing first filter in a second stage of the filtration system for removing particulate matter and for coalescing moisture present in the air that has passed through the first stage of the filtration system;

a second inertial moisture separator in a third stage of the filtration system for removing coalesced moisture present in the air that has passed through the second stage of the filtration system; and a line particulate filter in a fourth stag of the filtration system for removing particulate matter having a size of about 0.1 μm, wherein the fourth stage is the final filtration stage in the filtration system.

2. The multi-stage filtration system of claim 1, wherein the inertial moisture separator in the first stage is configured to remove water droplets having a size of about 5 μm.

3. The multi-stage filtration system of claim 2, wherein the coalescing first filter is configured to coalesce water droplets that are smaller than about 5 μm into water droplets larger than about 5 μm and to remove particles smaller than about 1-2 μm or greater.

4. The multi-stage filtration system of claim 3, wherein the second inertial moisture separator in the third stage is configured to remove the water droplets that are coalesced water droplets larger than about 5 μm.

5. The multi-stage filtration system of claim 1, wherein at least one of the first and second inertial moisture separators comprises a marine vane separator.

6. A filter house comprising:
an air intake hood;
a first inertial moisture separator in a first stage of the filter house behind the air intake hood, the inertial moisture separator configured to remove water droplets from intake air entering the filter house;
a coalescing pre-filter in a second stage of the filter house configured to remove particles in the air that has passed through the first stage of the filter house and to coalesce water droplets in the air that has passed through the first stage of the filter house; and
a second inertial moisture separator in a third stage of the filter house configured to remove from the air that has passed through the second stage of the filter house water droplets coalesced by the coalescing pre-filters; and
a fine particulate filter in a fourth stage of the filter house for removing particles having a size of about 0.1 μm or greater, wherein the fine particulate filter comprises a final filtration stage of the filter house.

7. The filter house of claim 6, wherein the first inertial moisture separator is configured to remove water droplets having a size of about 5 μm from the intake air entering the filter house.

8. The filter house of claim 7, wherein the coalescing pre-filter is configured to coalesce water droplets that are smaller than about 5 μm into water droplets larger than about 5 μm and to remove particles having a size of about 1-2 μm from the air that has passed through the first stage of the filter house.

9. The filter house of claim 8, wherein the second inertial moisture separator is configured to remove the coalesced water droplets that are about 5 μm.

10. The filter house of claim 6, wherein at least one of the first and second inertial moisture separators comprise a marine vane separator.

11. A method of filtering air to be used in a gas turbine, the method comprising:
removing water droplets from incoming air using a first inertial moisture separator;
after the step of removing the water droplets, filtering particles from the incoming air and coalescing water droplets that have passed through the first inertial moisture separator; and
after the step of filtering particles and coalescing water droplets, removing water droplets from the incoming air using a second inertial moisture separator; and
after the step of using the second inertial moisture separator, fine filtering the incoming air to remove particulates having a size of about 0.1 μm.

12. The method of claim 11, wherein the step of removing the water droplets from the incoming air using the first inertial moisture separator comprises removing water droplets having a size of about 5 μm.

13. The method of claim 12, wherein the step of filtering particles and coalescing water droplets from the incoming air comprises removing particles having a size of about 1-2 μm and coalescing water droplets that are smaller than about 5 μm.

14. The method of claim 13, wherein the step of removing the water droplets from the incoming air using the second inertial moisture separator comprises removing the water droplets that are coalesced water droplets having a size of about 5 μm.

* * * * *

UNITED STATES PATENT AND TRADEMARK OFFICE
CERTIFICATE OF CORRECTION

PATENT NO. : 9,114,347 B2  
APPLICATION NO. : 13/912891  
DATED : August 25, 2015  
INVENTOR(S) : William Keith Albert Eyers et al.

Page 1 of 1

It is certified that error appears in the above-identified patent and that said Letters Patent is hereby corrected as shown below:

IN THE CLAIMS

In column 5, claim 1, line 7, "line" should be changed to --fine-- and "stag" should be changed to --stage--. Should read "a fine particulate filter in a fourth stage".

Signed and Sealed this  
Eighth Day of March, 2016

Michelle K. Lee  
*Director of the United States Patent and Trademark Office*